United States Patent [19]

Lo

[11] Patent Number: 4,539,677
[45] Date of Patent: Sep. 3, 1985

[54] MULTIPLE ACCESS DATA COMMUNICATION SYSTEM

[75] Inventor: Yuan-Chang Lo, Boca Raton, Fla.

[73] Assignee: International Business Machines Corp., Armonk, N.Y.

[21] Appl. No.: 518,176

[22] Filed: Jul. 28, 1983

[51] Int. Cl.³ .......................... H04J 3/02; H04J 3/00; H04J 6/00
[52] U.S. Cl. ........................................ 370/85; 370/94
[58] Field of Search .................. 370/85, 60, 94, 48, 370/100, 83, 49, 99; 375/117

[56] References Cited

U.S. PATENT DOCUMENTS

| | | | |
|---|---|---|---|
| 3,752,932 | 8/1973 | Frisone | 370/83 |
| 4,210,777 | 7/1980 | Bowerman et al. | 375/117 |
| 4,412,326 | 10/1983 | Limb | 370/85 |
| 4,445,193 | 4/1984 | Mueller et al. | 370/85 |

Primary Examiner—Douglas W. Olms
Assistant Examiner—Wellington Chin
Attorney, Agent, or Firm—Robert Lieber

[57] ABSTRACT

In this data communication system, stations linked to a single line bus exchange information in a bit-serial asynchronous format in which transitions between stop and start signals mark beginnings of information bytes. The stations use a modified CSMA/CD protocol (carrier sense multiple access with collision detection) to obtain sending access to the bus. During information transfers, durations of stop signals are less than a predetermined limiting time length, but long enough to allow general purpose processing equipment at a station to participate directly in the real time process of information reception, thereby avoiding the need for having complex and costly adapting equipment interface between the bus and such processing equipment. When any transmission concludes, the bus remains at the stop signalling level. By conditioning detection of bus availability on timeouts conducted while the bus is in this condition, stations then ready to transmit avoid interfering with ongoing transmissions. After timing out, any station may begin transmitting. At this same time, all stations monitor the bus receptively. If a station not currently sending detects a start-stop transition, its processor is interrupted and directly examines the following information byte signals. If a sending station detects a transition, its processor acts to sense for bus collision by comparing the byte last transmitted with the byte last received from the bus. If collision is detected, the sending process is aborted and the timeout process for detecting bus availability is repeated. If collision is not detected, the sending process continues.

11 Claims, 13 Drawing Figures

\* — CRC = CYCLIC REDUNDANCY CHECK

FIG. 5
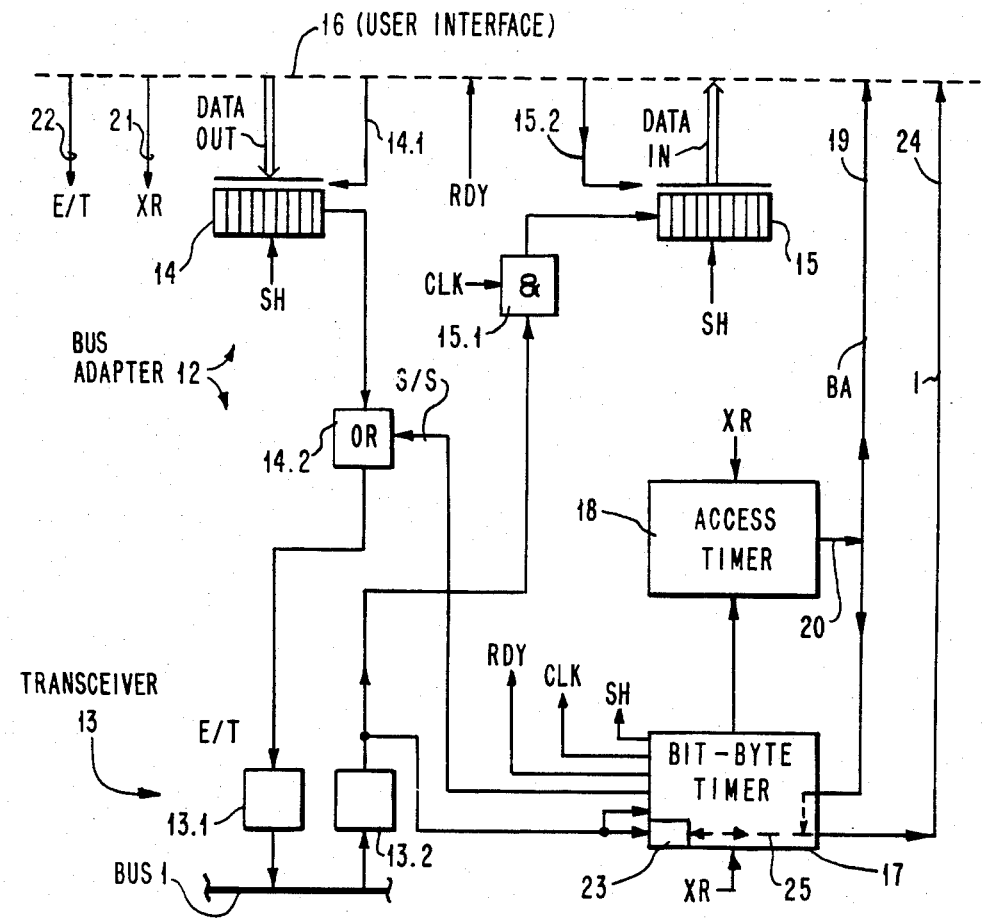
FIG. 6 ACCESS TIMER 18
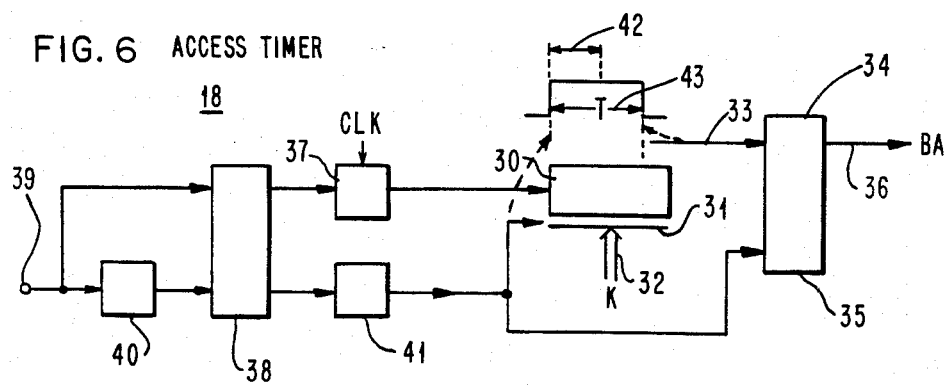

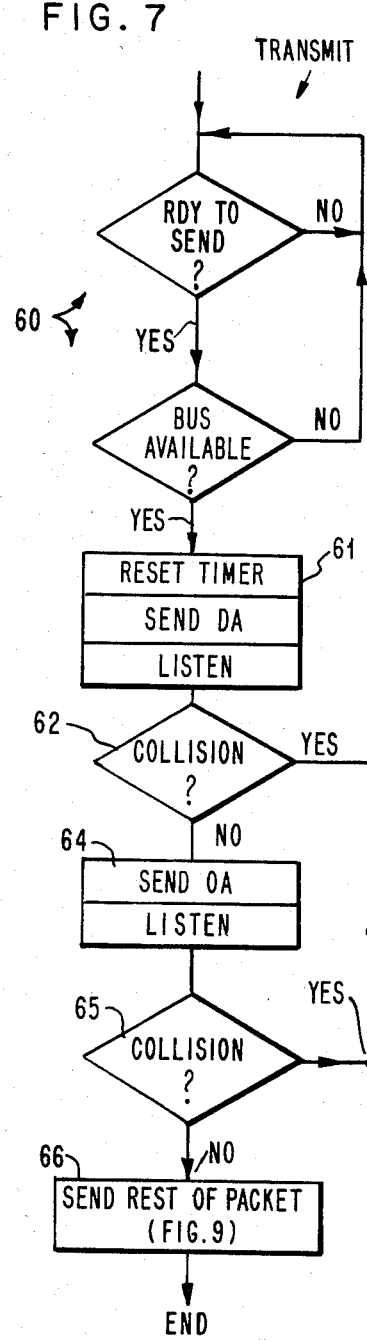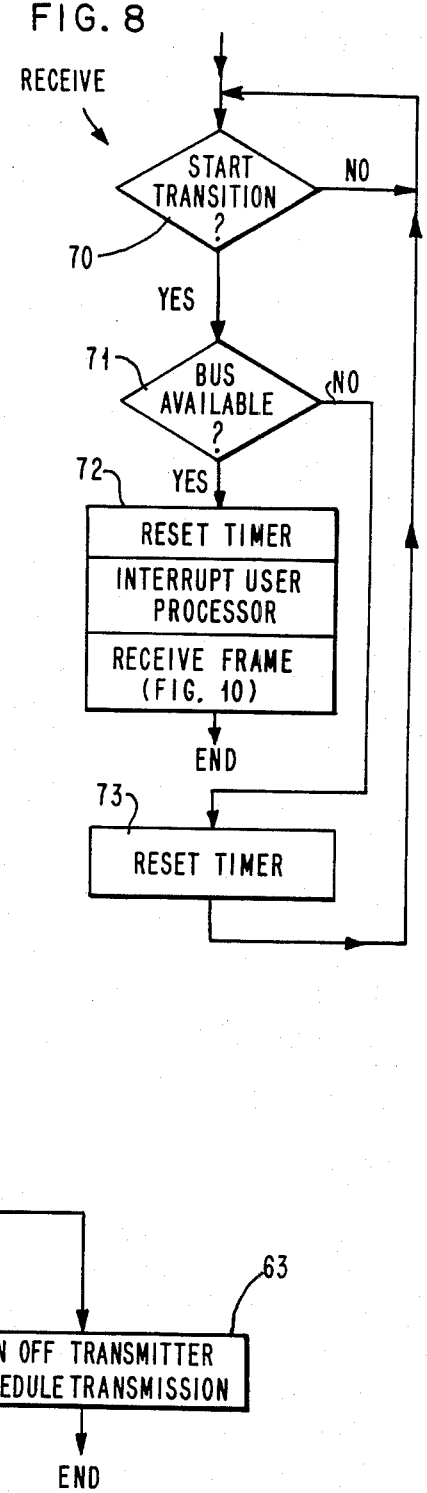

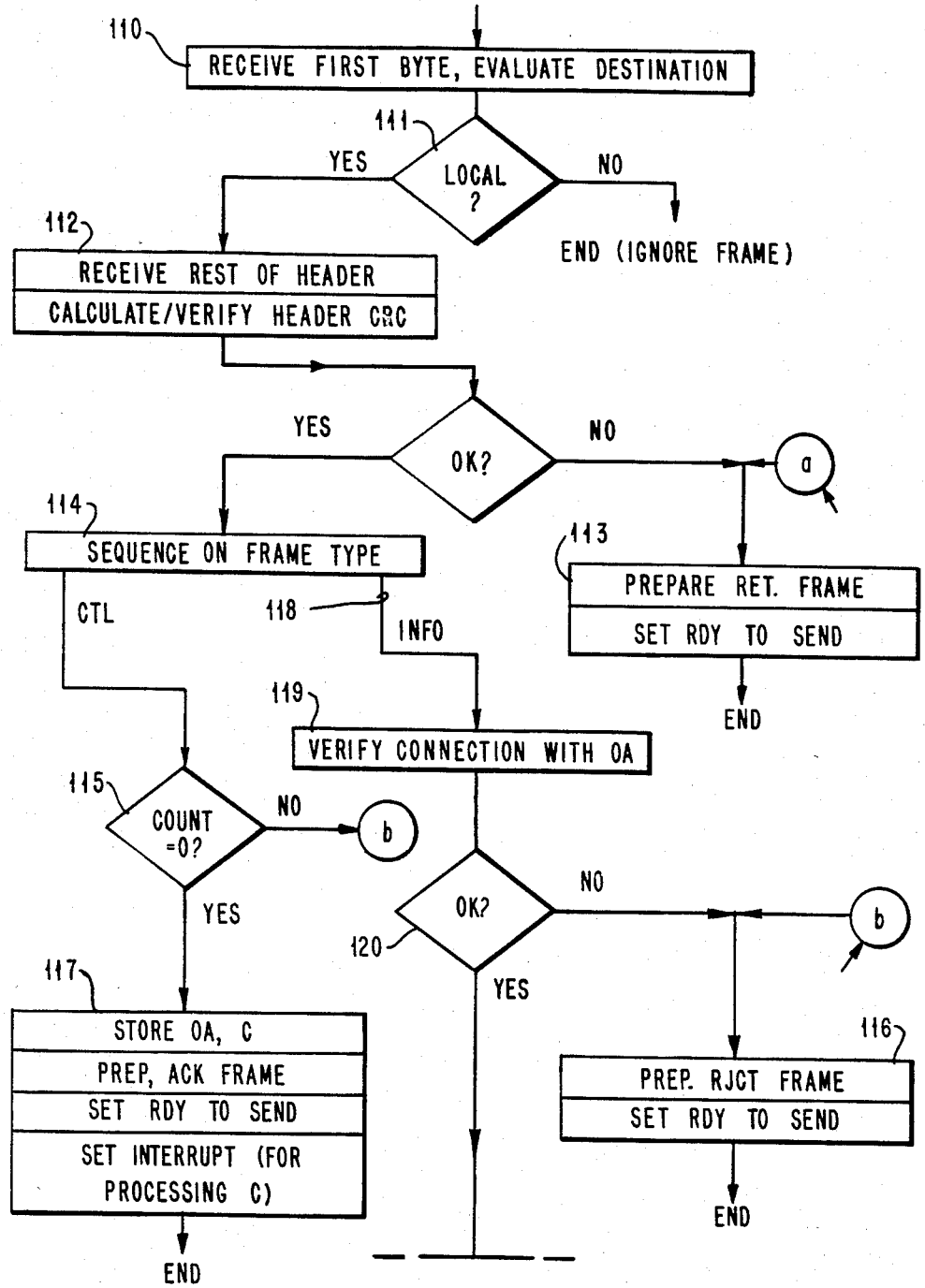

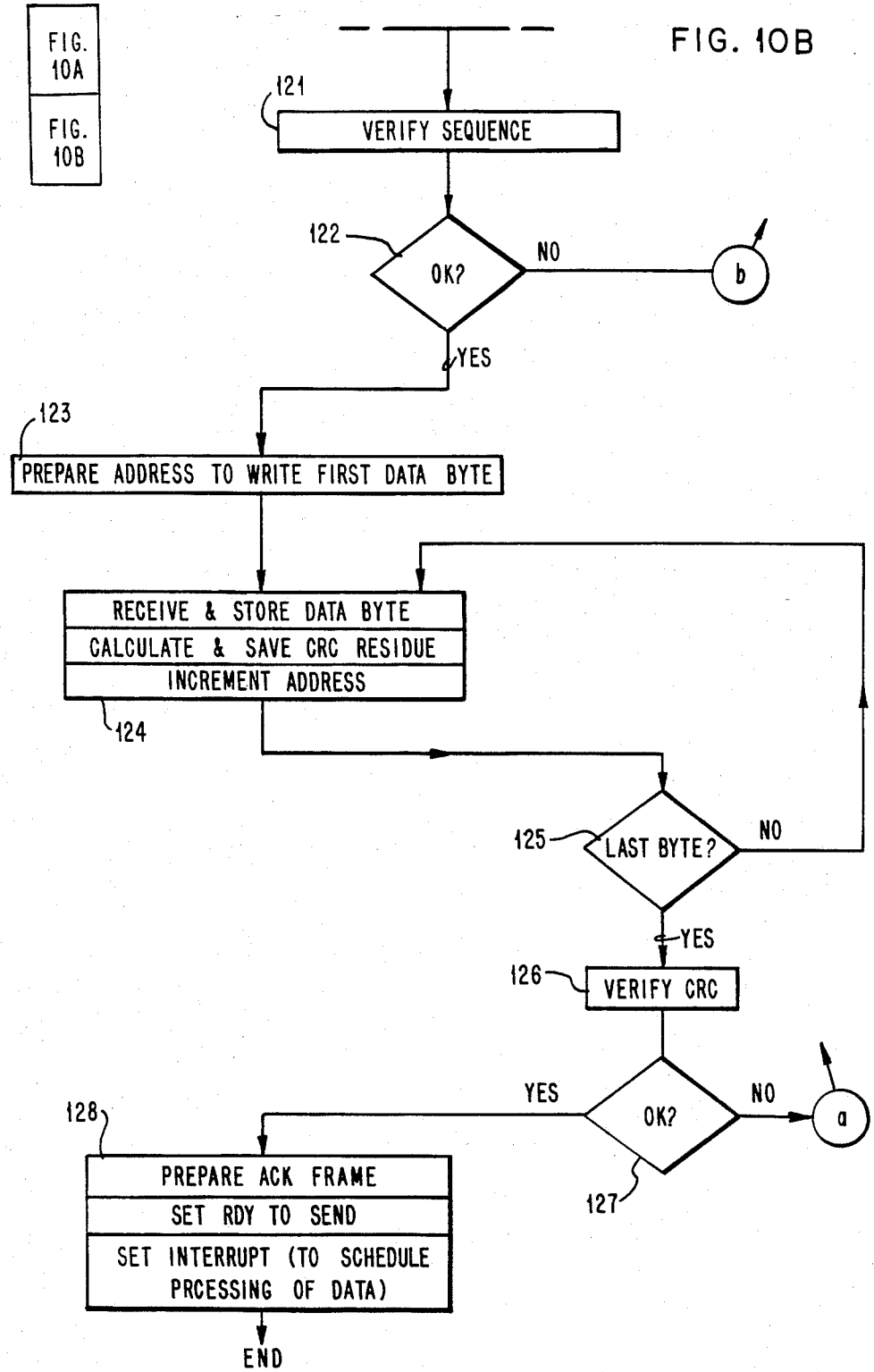

MULTIPLE ACCESS DATA COMMUNICATION SYSTEM

CROSS REFERENCE TO RELATED PATENT APPLICATION

My co-pending and commonly assigned patent application Ser. No. 518,175 entitled "Method and Apparatus For Facilitating Collision Detection", filed July 28, 1983, discloses a method for detecting interference between stations having simultaneous access to a common bus, which can be used to advantage in association with the present invention.

BACKGROUND OF THE INVENTION

This invention relates to multiple access bus communication systems and particularly to systems for reliably and cheaply connecting low cost personal computers.

U.S. Pat. Nos. 4,063,220 and 4,210,780 disclose systems which are considered representative of the present state of the art in multiple access bus communication. U.S. Pat. No. 4,063,220 discloses synchronous baseband bit signalling, and U.S. Pat. No. 4,210,780 describes a carrier modulated system with asynchronous start-stop signalling. Both systems require sophisticated transceiving and adapting equipment to interface between the bus medium and "user devices" served by that medium.

The arrangement shown in the '480 patent requires expensive modem equipment in its transceiver for sustaining its modulated communications, and the schemes shown in both patents require dedicated multi-byte buffers and control circuits which add to the expense of their systems.

Recently, personal computers have become available for serving a market of users having limited financial resources. Such computers may have lower processing speeds than the larger more expensive systems, but they are nevertheless quite versatile and growing in popularity; particularly among individuals and small businesses whose data processing requirements are relatively simple and not dependent on fast handling of large volumes of data.

Such users may acquire several personal computers and eventually have need for interconnecting them for various purposes. For such users, connection to a multiple access bus in the manner described in the above-referenced Metcalfe et al patent would be desirable. It would not require expensive "head end" or master control equipment separate from the user devices, failure at one link node would not disable the entire network, and the baseband signalling method would not require expensive modems. However, synchronous bit signalling itself is not inexpensive. It requires tight timing coordination between the transceiver and the bus, which in turn requires buffering of plural bytes and exclusive dedication of complex hardware for directing real time control operations at the transceiver interface. These functions may involve sufficiently costly adapting equipment to make such connections unfeasible for a large segment of the potential market.

Accordingly, a principal object presently is to provide an inexpensive yet reliable multiple access communication system for connecting low cost computers.

Another object is to provide an inexpensive multiple access bus system for linking user device systems containing inexpensive personal computers, or the like.

Yet another object is to provide for linking such user device systems via passive taps to bus media carrying simple baseband signals, and via primitive and inexpensive apparatus interfacing between the user systems and such media.

SUMMARY OF THE INVENTION

Briefly, the present invention employs primitive transceiver/adapter units, each unit buffering only one byte of data at a time, to interface in "real time" between user device systems containing low cost, general purpose computers and a multiple access bus. Variable length information packets are carried on the bus in a bit-serial asynchronous baseband signal form. Within each packet, groups of data bit signals constituting bytes are delimited by stop and start signals providing a level transition serving as a time reference for reception of the associated information bit group. In the present arrangement, the time allowed for transferring a byte on the bus, including the start and stop signals, is tailored to operating characteristics of computers in the user device systems, in order to permit direct participation of such computers in the operations ancillary to each byte transfer; e.g. calculation of running check residues, etc.

A timer in the present adapter allows access to the bus for local transmission when a given signal level is continuously present on the bus for a predetermined "limit" (or "threshold") time. The given level is that used for transmittal of stop signals, and the limit time is longer than the time allotted for transmitting one stop-start pair and a data byte. When its threshold is exceeded, the timer activates a "bus available" indication which primes the adapter and user device to begin transmitting a data packet if ready to do so.

The timer is reset when the bus signal changes from the stop level to the start level. If this occurs while the bus available indication is active, an interruption is presented to the user device computer. If the local site is not then transmitting, the interruption prompts the local user device computer to recognize arrival of a new packet and examine the first incoming byte (destination address) for determining if the packet is directed to the respective device. If the local site is transmitting when the bus level change occurs, the interruption is suppressed and the computer evaluates the first received byte for collision. If the site is not transmitting, and is not the destination of the incoming packet, the computer directs the adapter to ignore the rest of the incoming packet and reverts to its primary processing tasks. If the packet is directed to the respective site, the computer cooperates with the adapter/transceiver to receive, verify and store the incoming information.

Since the user equipment is adaptable hereby to attend directly to operations associated with verification and transfer of individual packet bytes (either incoming or outgoing)—by virtue of the tailored byte transfer timing feature above—the requirements for discrete special purpose adapting circuits can be decreased. Hence, the cost of adaptation can be lessened and the adaptation function can be implemented more simply (and therefore potentially more reliably and at less cost).

The timer for the "bus available" function contains a programmable counter. Another system embodiment described herein gives an example of how this feature can be used to order accesses to the bus by competing users so that the bus is effectively accessible to only one user at a time.

The foregoing and other objects, features, advantages and benefits of this invention may now be more fully understood by considering the following description and claims.

BRIEF DESCRIPTION OF THE DRAWINGS

FIG. 5 is a block diagram of an adapter and transceiver unit in accordance with the invention for the system of FIG. 2.

FIG. 6 shows presently relevant details of the programmable timer section of the adapter in FIG. 5.

FIGS. 7 and 8 illustrate operations performed by the station apparatus characterized in FIGS. 1-6 for establishing transmission and reception access to the common bus.

FIGS. 9 and 10 illustrate discrete byte sending and receiving operations performed by user systems in accordance with the present invention relative to the bus interfacing apparatus 6 in FIG. 2. FIG. 10 consists of FIGS. 10A and 10B.

DETAILED DESCRIPTION

Figure 1:
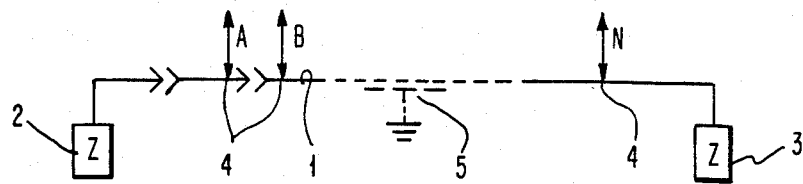
FIG. 1 shows an environmental CSMA/CD bus communication system in a block diagram form.

Referring to FIG. 1, an environmental bus communication system suitable for the present invention includes bidirectional bus medium 1, terminating in impedances 2, 3 and having passive taps 4 at sites of connection to user stations (access nodes) A, B, . . . , N. The terminating impedances 2 provide conductive connections to signal grounds. Distributed capacitance between each connection site and ground is suggested at 5.

Figure 2:
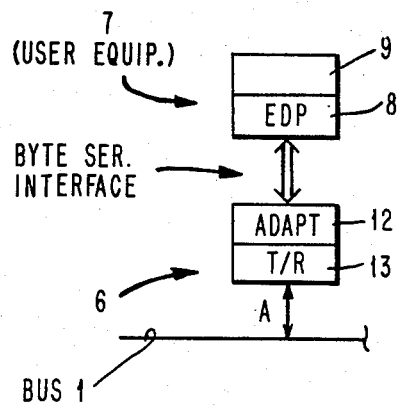
FIG. 2 shows a station implementation for the system of FIG. 1 in accordance with the present invention.

In this environment, user equipment in accordance with the present invention is suggested in FIG. 2 and detailed in FIGS. 3-7. Such equipment comprises transceiving and adapting apparatus 6 for interfacing between the bus 1 medium 1 and the main body of user equipment 7. The apparatus 6 is considered "primitive" in the sense that it contains very limited logical and storage capabilities. It transfers information bit serially to and from the bus medium in a baseband asynchronous form described below, and it forwards such information byte serially from and to the user equipment 7 in a bit parallel byte serial form. It also determines the accessibility of the bus for initiating local origin transmissions as explained later. At any instant of time, it can handle (and buffer) only a single byte of information.

The user equipment comprises a general purpose, inexpensive electronic data processing system 8—for instance, a personal computer system centered on a single-chip microprocessor—and associated local "peripheral" attachments 9 (e.g. diskette drive, printer, display, keyboard, etc.)

In the preferred embodiment to be described next, the stations send variable length data packets to each other through bus medium 1 and use a "Carrier Sense Multiple Access With Collision Detection (CSMA/CD)" protocol for obtaining access to the bus. This protocol, which is described at length in the above-referenced Metcalfe et al. patent, allows stations which are prepared to send a packet to begin sending immediately upon sensing an idle condition on the bus medium. While sending the stations compare the bit signals received from the bus to those being transmitted and abort their transmissions when a collision or interference condition is detected. Aborted transmissions are rescheduled by the stations after "backoff" delay intervals which are randomly timed in order to lessen the likelihood of repeated collisions by the same competing stations.

Figure 4:
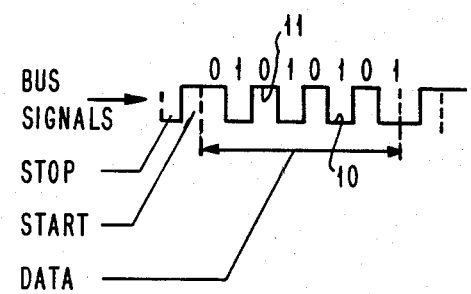
FIGS. 3 and 4 show packet and byte signalling formats for the present system.
Figure 3:
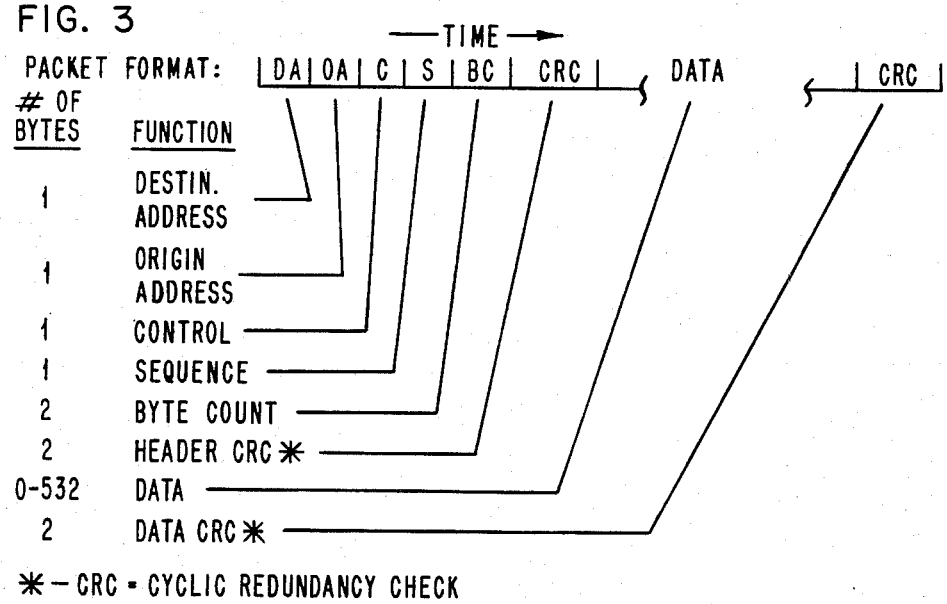

Packet and byte signalling formats presently used are respectively indicated in FIGS. 3 and 4. As shown in FIG. 3, a packet (also referred to herein as a "frame") consists of an 8—byte control header followed by a variable number of data bytes. The header comprises a destination address byte DA, an origin address byte OA, a control byte C, a sequence defining byte S, a 2—byte "count field", and a 2—byte cyclic redundancy check term ("header CRC") which is used to verify correct transfer of the header. The data field (which is "optional" as explained later), contains from 0 to 532 bytes of data followed by a second 2—byte "data CRC" field (which appears only if the data field contains at least one byte) used for verifying correct transfer of the data. The functions specifically served by the header bytes are discussed next.

The destination address DA defines the station node(s) to which the packet (frame) is addressed. A frame can be addressed either to a single node or all nodes (all nodes via a special "broadcast address" reserved for that function). The origin address OA defines the location of the packet source, and is used by the receiving station for returning an acknowledgement frame or other response to that source.

The control byte C defines the frame type. The present system contemplates two types of frames: information frames for transferring information or data between nodes, and control frames for assuring reliable transfer of information frames. The present system uses seven different species or sub-types of control frames and one type of information frame (distinguished by eight distinct code combinations in the C field). The control frame species are: acknowledge (ACK) for confirming receipt of an information frame, connect (CON) for establishing a virtual connection between the origin and destination nodes, disconnect (DCON) for severing a previously established virtual connection, abort (ABT) for severing an existing and currently active virtual connection, broadcast (BDCST) for signifying that all nodes are to receive the frame, retransmit (RET) for requesting retransmittal of an information frame received with a CRC error, and reject (RJCT) for indicating receipt of an information frame out of sequence or when the receiving node user equipment is not properly ready for accepting it.

The sequence number S is used to ensure that frames are not redundantly received when acknowledge frames fail to reach the source of information frames. This number is incremented by one each time the source node sends an information frame which has been accepted/acknowledged by the destination node.

The count field defines the number of information bytes following the header. If the frame is a control type frame, the value in this field must be zero.

The header CRC is calculated while the header is being sent and appended to the header. The receiving node duplicates this calculation (on the fly, as explained later), and compares its calculated CRC to the received one. If they are not equal, the rest of the frame is ignored.

The data contained in an information type frame may include commands which themselves require interpretation and acknowledgement by the user processing system at the receiving node. The final CRC accompanying data is calculated by the origin node processor during the transfer and appended to the data as the last transmitted two bytes. The processor at the receiving node performs a like calculation during its "real time" reception and compares the calculated and received CRC functions. If they are not the same, a request for retransmission is returned to the origin node.

FIG. 4 illustrates the asynchronous bit-serial signalling format used on bus 1. Each byte signal contains a stop bit, a start bit and 8 information (data) bits. The bit signals are in baseband form; i.e. they are not modulated on a higher frequency carrier (although they may be amplified relative to logical amplitude levels employed within the user equipment). The stop bit and logical "1" information bits are represented by low (ground) voltage levels 10, and the start bit and logical "0" information bits are represented by high (supply) voltage levels 11. The byte timing is tailored to operating characteristics of the user processor as explained later, which effectively limits the byte transfer rate (in the present example to the relatively low speed of 5,780.35 bytes per second). The transition between the stop and start bits provides a time reference point for synchronizing local receiver oscillators for reception of the accompanying data bits.

FIGS. 5 and 6 illustrate relevant parts of the adapter and transceiver elements of a subject bus access node or station. FIG. 5 illustrates the overall configuration of the adapter/transceiver unit and its interface to the subject bus and user system. FIG. 6 shows details of the programmable timer which controls access to the bus. The adapter is generally indicated at 12 and the transceiver at 13 (FIG. 5).

Referring to FIG. 5, transceiver 13 comprises a 3-state transmitter/driver 13.1 and a receiver amplifier 13.2. Adapter 12 comprises an output shifter 14 and an input shifter 15 which pass information signals between the user equipment interface 16 and the transceiver. The shifters effect serial-to-parallel conversions on information bits received from the bus and parallel-to-serial conversions on information bits transferred to the bus. Circuits 17 direct the shift operations of shifters 14 and 15, and time bit and byte transfers between the bus and the shifters. Outgoing information is gated into shifter 14 by gate signals on line 14.1, and shifted out to the bus through OR circuit 14.2 in which the start and stop signals are inserted by action of timer 17. Incoming information is stripped of start and stop bits in AND circuit 15.1, shifted into shifter 15 and passed to the user by gate signals on line 15.2.

Circuits 18, used for determining the accessibility status of the bus, initiate a timeout when the bus signal drops to the low level associated with stop bits. If this level persists for a predetermined threshold time T, which is longer than the time allotted for transmission on the bus of one byte, including stop and start bits (i.e. in the presently described implementation, longer than 173 microseconds), circuits 18 activate a Bus Available (BA) control indication which is presented to the user processor, via line 19, and the local timer 17 via line 20.

When access timer 18 resets, and this occurs whenever the bus signal undergoes a transition to the high level, the BA indication is deactivated if it had previously been active (after a slight delay to avoid glitches). Timer 18 can also be reset by the user system via (external reset or XR) line 21. When BA is active and the user is in a "ready to send" condition (i.e. ready to transfer a frame to the bus), the user processor activates a transmit enabling control indication (E/T) on line 22 and immediately begins to transfer a frame over interface 16. Since other stations on the bus have the same access control procedures, they may interfere with such transfers. The procedures employed presently to detect such interference/collision occurrences, and to defer frame transfers, will be described later with reference to FIGS. 7 and 9.

Stop to start (low to high) transitions on bus 1 are recognized by circuits 23 in timer 17. When such transitions signify a newly arriving frame (BA active locally, and E/T inactive), circuits 17 operate a not-shown latch to present a high priority interruption request I to the user processor via line 24.

In output operations, the user system prepares the frame information in its store, and passes it byte serially to register 14 under control of signals on line 14.1. The adapter shifts the information out to the bus through OR circuit 14.2, under the direction of shift control signals SH supplied by circuits 17, and inserts stop and start bits by action of circuits 17. While the first two bytes are being handled, the adapter and user system cooperate to monitor the bus for collision. During the entire packet transfer the user processor calculates the CRC residue and appends its final value to the header, and to the data if data follows the header.

In input operations, the adapter interrupts the user system in response to the initial stop-to-start transition on the bus, and clocks the incoming information into shifter 15 through AND circuit 15.1. The stop and start bits are used for reception synchronization, but not passed to the shifter. As each byte is assembled the user system gates it across the interface under control of gating line 15.2. The user system examines the destination (first) byte and selectively conditions the adapter to receive or ignore the rest of the frame.

Referring to FIG. 6, access timer 18 comprises a counter 30 having input gates 31, connectable to a source 32 of a digital constant K, and an overflow output 33 connected to the setting input 34 of a latch 35. In the set state, output 36 of latch 35 provides the Bus Available (BA) indication mentioned previously. Counter 30 counts clock pulses CLK passed by gate 37 when latch 38 is set. Latch 38 is set by each high to low level transition in the bus signal received at 39 from receive amplifier 13.2 (FIG. 5). Recall that the low level is that associated with the stop signal. The complementary transition from low to high level is inverted by inverter 40 and used to reset latch 38. When reset, the latch operates single shot circuit 41 to produce a pulse which resets counter 30, via gates 31, and also resets latch 35.

In FIG. 6, the time allotted for transmittal of a single byte plus the accompanying stop bit is indicated at 42, and the time T required for counter 30 to overflow, after being reset, is indicated at 43. The time T is evidently longer than the time for byte transmittal. Under normal circumstances, a terminal which is actively transmitting a frame will not allow the time elapsed between successive byte transfers to equal or exceed T. Accordingly, the persistance of a low level condition on the bus for a time T, or greater, represents an idle condition between frame transfers during which the bus is accessible for initiating a local frame transfer.

The operations performed by the user processor 8 (FIG. 2) relative to the bus interfacing equipment 10, 11 (FIG. 5) will now be described with reference to FIGS. 7-10. FIGS. 7 and 8 indicate operations performed for controlling access to the bus (transmission access shown in FIG. 7, and reception access in FIG. 8), and FIGS. 9 and 10 detail operations performed for transfers of bits, bytes and frames (transmission transfers shown in FIG. 9 and reception transfers in FIG. 10).

Referring to FIG. 7, the user processor conditions its output access to the bus on having an internally available "ready to send" indication coincident with a bus available (BA) indication externally presented by the adapter as described previously. The "ready to send" indication is activated after the processor has prepared the information for a frame transfer and queued that information in a suitably prepared storage space. The decision functions associated with the access determination are indicated at 60 in FIG. 7.

If the "transmission" access conditions are satisfied, the processor dedicates itself fully to the output bus communication task and proceeds to control the performance of operations indicated at 61. It resets access timer 18 (by activating XR interface lead 21, FIG. 5). It presents the first frame byte (i.e. the destination address DA) to the adapter, together with suitable enabling control signals at 22 and 14.1 (FIG. 5). These cause the adapter to receive the DA byte in bit parallel form in its register 14, and to transfer it to the bus 1 in bit serial form (preceded by a start bit and followed by a stop bit inserted by not-shown circuits contained in the bit/byte timer block 17; such circuits not being detailed since they are presently well known to those skilled in the art of asynchronous start-stop communication). At the same time, the user processor activates the receiver section 13.2 in the adapter to monitor the bus receptively while the first byte is being transmitted (e.g. by activating reception enabling control lead 25, FIG. 5) and determines if an interference/collision has occurred (by comparing a saved copy of the transmitted byte to the byte received through the bus and register 15 under control of gating lead 15.2, FIG. 5).

Sequencing on the results of the collision monitoring operation, as suggested at 62, the user processor performs operation 63 or 64, depending respectively on having detected a collision or no collision. If no collision has been detected, the processor directs operations 64 and 65 in which it retrieves the second frame byte (i.e. the origin address OA), passes it to the adapter (while the adapter is enabled for both transmission and reception), monitors receptively for collision and conditions its next action on the presence or absence of a collision.

If a collision is detected at either decision stage 62 or 65, the processor directs concluding actions 63 to: immediately deactivate the transceiver, select a delay period in accordance with a random number generated by means disclosed in the above-referenced U.S. Pat. No. 4,063,220 and not relevant to the present invention, schedule a re-attempt to transfer the same frame at the end of that period, and then conclude its current task operations relative to the bus. If a collision is not detected at decision stage 65 (i.e. after the OA byte transfer), the processor directs actions 66 to complete the outbound frame transfer (in accordance with actions to be described later with reference to FIG. 9).

FIG. 8 indicates the process for accepting (and storing) or rejecting an incoming frame. When the adapter detects a start transition associated with a newly arriving frame (output from circuits 23, FIG. 5, while BA is active and the local transmitter is inactive), it sequences through decisions 70 and 71 to actions 72 for linking its user receptively to the bus. In these actions, the adapter presents a priority interruption to the user processor (via line 24, FIG. 5), resets its bus access timer and receives continued reception enabling control E/R from the user processor. Thereafter, the user processor and adapter cooperate to either receive (and store) or ignore the incoming frame in accordance with the process outlined in FIG. 10. If the bus is not available at decision stage 71 (i.e. if the start transition is one occurring between arrivals of successive bytes of an incoming frame), the adapter resets the access timer (action 73) and continues its previous actions (repeating decision tests 70 and 71, etc.).

Figure 9:
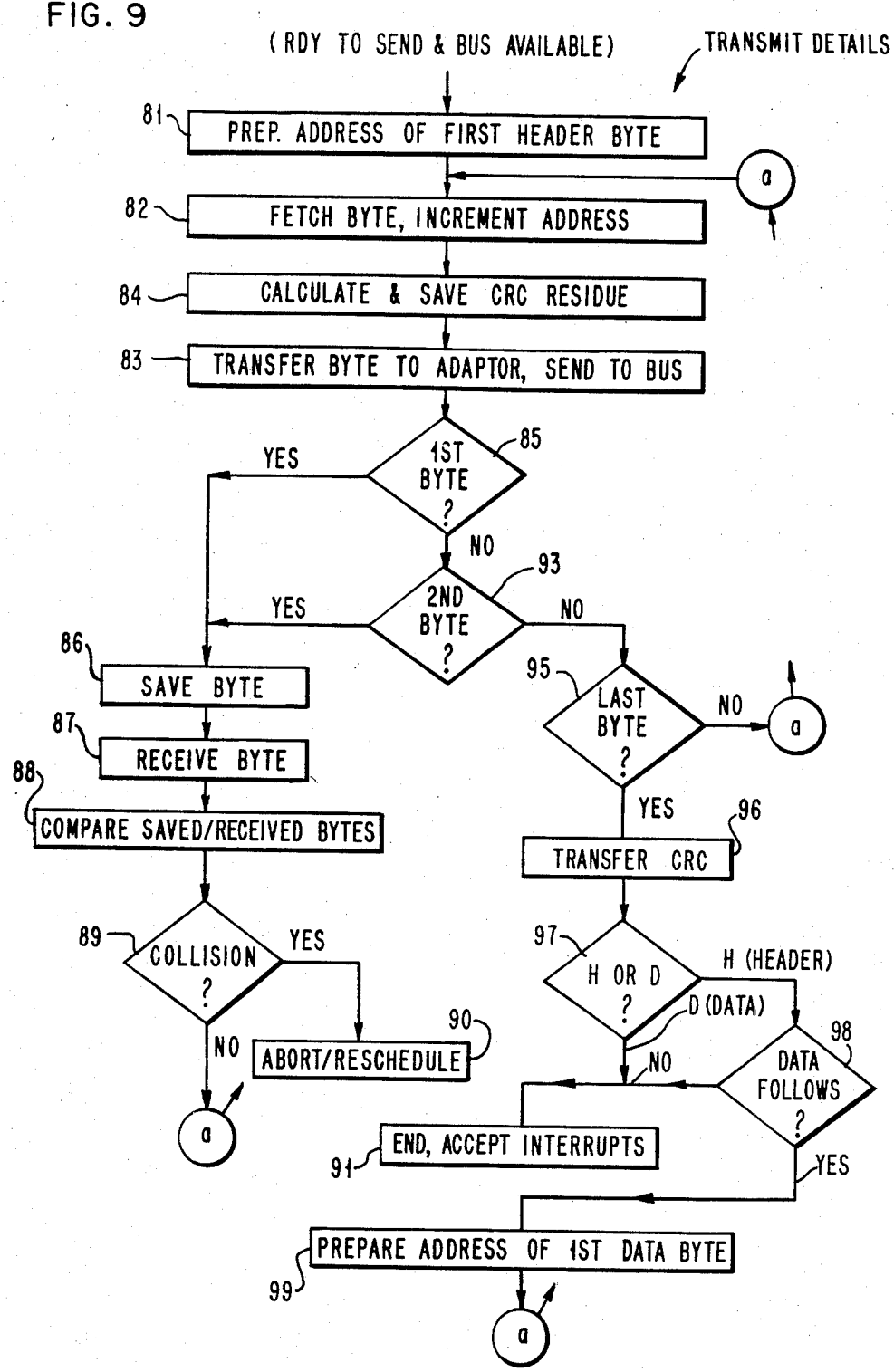

FIG. 9 indicates the process performed by a user processor for transferring an information frame to the bus adapter. Assuming a ready to send internal status and BA (Bus Available) bus status, the processor begins to retrieve a first header byte from its store (destination address) and transfers it to the bus via the adapter (actions 81-83). It also calculates and saves a CRC (cyclic redundancy check) residue correlated to the transferred byte (action 84) and updates the storage address function last used for (header) frame byte retrieval (as part of action 82). The bus adapter is enabled for transmission (control function E/T active in FIG. 5), and passes the byte bit-serially out over the bus (preceded by a start bit and followed by a stop bit).

At the same time, the processor operates through the "yes" path of decision function 85 to monitor the bus receptively for collision (actions 86-89). The user processor compares the received byte to a copy of the DA byte which it has saved. If they are not the same, collision is recognized, causing the processor to abort (deactivate the transmitter and receiver) and reschedule the transfer as explained previously (action 90). If the transfer is aborted, the processor terminates its transfer process and becomes available for other tasks (action 91). If the compared bytes agree (no collision), the processor sequences through the "no" path at decision stage 92 (since it is then handling the first byte of the frame) to retrieve and transfer the second header byte (OA) via action sequence 82-84. Taking the "no" path at decision 85 and the "yes" path at decision 93 (since the second header byte is then being handled), the processor repeats the collision sensing functions 86-89 and either defers the transfer (actions 90, 91) or continues it.

To continue the transfer, the processor takes the actions 82-84, the "no" path at decisions 85 and 93, and decision 95—to transfer the remaining frame bytes without further collision monitoring. It should be noted here that the combined time lengths of the DA and OA transfers exceed the maximal propagation delays between access nodes to the bus by a time sufficient to ensure that effects of any potential interference will have affected all nodes, and that the codes assigned to these bytes are sufficiently unique to ensure recognition of collision whenever it occurs.

After transferring the last informational byte of either the header or data portion of the frame, the processor takes the "yes" path at decision 95 and transfers the accumulated CRC residue for that portion (action 96). If the header transfer is then complete, the processor takes the "H" path at decision 97, determines if the frame contains a data portion (decision 98) and, if it does, proceeds to retrieve and transfer the bytes of that portion via action 99. If the frame does not contain data, the processor terminates via action 91. If data is sent, the sequence concludes with the data CRC transfer (action 96 and "D" exit at decision 97).

FIGS. 10A and 10B, arranged together as shown to the left of FIG. 10B, illustrate the operations performed by the user processor for receiving a bus frame. Recall that when the Bus Available indication is active and a bus level transition is detected, the adapter presents an interruption to the user processor engaging the latter's attention. The receiving circuits of the adapter remain enabled and the first byte is received (using the stop-start transition as a time reference for sampling the bits of that byte). The first byte is passed from the adapter to the user processor, and evaluated by the latter as the destination address for the incoming frame (action 110).

If the frame is not directed to this user, the "no" path is taken at decision stage 111 and the remainder of the frame is ignored. If the frame is directed to the local user (either specifically, or as a "broadcast" frame), the adapter/receiver remains enabled and the rest of the frame is handled via the action sequence starting at 112. The adapter/receiver receives each subsequent byte of the header, and passes it to the user processor. The latter develops the cumulative CRC residue for the entire header (including the first DA byte) and compares its final value to the received header CRC.

If the received frame is a control frame (i.e. one with no data following the header), the user processor verifies that the frame byte count value is 0 via decision action 115. If the byte count value is not 0, the processor terminates reception processing via action sequence 116; in which it first prepares a "reject" (RJCT) control frame directed to the source of the just received frame, and sets a "ready to send" indication. As noted previously, the "ready to send" prepares the local system to transmit the prepared frame when the bus available indication next activates. If the byte count value is 0, the user processor proceeds via the terminating action sequence 117 to: store the relevant information in the received frame for further processing, prepare an acknowledge frame directed to the source of the received frame, set a ready to send internal indication, and set an internal interruption request directed to the program task for processing the received information. The ready to send conditions the system to transmit the ACK frame and the interruption request conditions the system to process the received information when it can.

If the received frame had been an information type frame (i.e. one with data following the header), the user processor would have taken the "information" path 118 at decision stage 114. In that path, the processor would first have determined at 119 that a "virtual" connection had been established between the local system and the frame source (e.g. by referring to information exchanged through earlier control and acknowledge frame communications). This determination would be made before the arrival of any data bytes. If the processor should find that the required connection did not exist, it would terminate the reception process via the "no" path through decision 120 and action sequence 116 mentioned previously, and thereby return a reject frame to the source of the received frame.

Assuming that the required virtual connection exists, the user processor would next verify through action 121 and decision 122 that the incoming frame has arrived (been received) in the proper sequence (by examining the S byte in the just received header and comparing it to a sequence count function locally developed). If the reception sequence is incorrect, the processor exits through the "no" path of decision 122 and returns a reject frame to the source of the received frame. If the frame is being received in its proper sequence, the processor prepares for reception of the data portion of the frame via action 123 and action sequence 124.

To receive the following data bytes, the processor prepares the address of a storage space in which to store the next received data byte (action 123), receives the next byte when it is available at the adapter interface, stores that byte at the prepared address location, calculates and saves a cumulative CRC residue function and updates the address in preparation for reception and storage of the next byte. At this point, the processor acts through decision 125 to either repeat action sequence 124 for a next received byte or conclude the reception sequence if the last byte has been received. In the concluding action sequence, the processor compares the received CRC function to the cumulatively calculated/saved function at 126, 127 and returns either a retransmission request control frame (RET) or an ACK frame acknowledging correct reception to the source of the received frame. In the concluding sequence 128 for acknowledging correct reception, the processor sets an interruption request for evoking the internal programs responsible for processing the received data.

The system just described permits users at different access nodes to the shared bus 1 (FIGS. 1 and 2) to attempt to access the bus simultaneously (when it appears to be accessible), monitor for collision during transmittal of the first two frame bytes, and defer access when they detect collision. In this type of system, the access timers 18 (FIG. 5) at all user nodes would be programmed for identical timeout operations. In an alternate embodiment described next, the user systems at different access nodes have differently programmed access timers which effectively provide exclusive access "windows" to respective user systems at staggered times, and thereby permit only one user at a time to attempt to transmit on the bus. This embodiment is illustrated in FIGS. 11 and 12.

Figure 11:
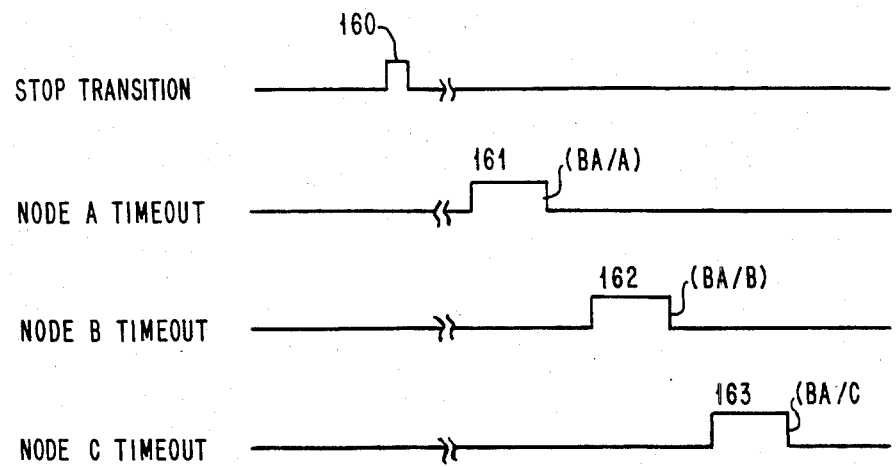
FIG. 11 schematically illustrates another embodiment of station apparatus in accordance with the present invention for allowing "collision-free" access to the bus.
Figure 12:
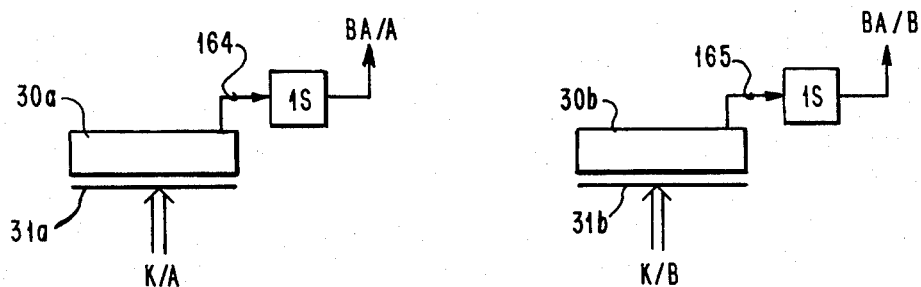
FIG. 12 illustrates procedures used by stations configured in accordance with FIG. 11 for obtaining exclusive access to the bus.

As shown in FIG. 11, user systems at access nodes A, B, C, (etc.), begin their respective access timeouts from the same reference time 160 at which the bus level changes from high to low, but then generate respective bus available signals—BA/A, BA/B, BA/C, etc.—at time staggered intervals 161, 162, 163, etc. As shown in FIG. 12, the bus adapters in these user systems have access counters 30a, 30b, etc., similar to the counter 30 in FIG. 6, which are initially set with different delay constants K/A, K/B, etc., through respective loading gates 31a, 31b, etc. Consequently, the overflow outputs 164, 165, etc., of these counters become active at different times (assuming the bus remains at the stop level throughout their counting periods). These outputs in turn trigger respective single shot circuits "1S" to generate the respective availability pulse indications BA/A, BA/B, etc.

In the foregoing description, the operations performed by the user processor during each byte transfer are related in real time to the respective transfer, and the byte length on the bus is tailored to allow for these operations to be completed. It should be understood that with sufficient stop time, the user processor could also perform operations unrelated to byte transfer but nevertheless useful to support reliable transfer; e.g. operations to test for faults in the adapter/transceiver and to isolate the latter from the bus when faulty.

Various modifications of the foregoing will readily be apparent to those skilled in the art of local area networking. Such modifications are considered within the scope of the present invention if embraced by the definitions in the appended claims.

I claim:

1. A method of transmitting multi-byte information messages between transceivers linked in a multiple access mode to a common bus, each transceiver interfacing between the bus and a respective user device, each device containing a general purpose computer adapted for multiple applications, comprising:

transmitting digital signals representing a said message from any one of said user devices through a respective one of said transceivers to said bus, said signals being arranged in a bit-serial asynchronous baseband form, said signals containing groups of first signals representing information bytes, each such byte group preceded by a respective group of second signals defining the beginning of the respective byte group, each said second group consisting of paired stop and start signal elements; the stop and start elements in each pair having different amplitude levels providing a transition on said bus which forms a time reference for reception of the bits in the following byte group;

receiving and temporarily storing said byte groups one at a time at transceivers connected to other said user devices; and timing durations of stop signals in said second groups to allow sufficient time between receptions of consecutive byte groups at said other devices to permit respective computers of said other devices to be interrupted and perform real time processing operations relative to each received byte group while a next byte group is being received, as required for handling reception of the respective message.

2. The method of transmitting information in accordance with claim 1 comprising:

restricting durations of stop signals sent by said any one user device in association with information to be less than a predetermined limiting length of time;

conditioning said bus to manifest a stop signal level continuously after said any one user device finishes transmitting respective information;

at each of said user devices timing out durations of stop signals manifested on said bus for distinguishing periods when a stop signal persists for a length of time longer than said limiting length;

activating a bus available indication at any device detecting persistence of said stop signal continuously for a length of time exceeding said limiting length; and enabling any user device and transceiver which are ready to send information signals to begin transmitting respective information when and only when the respective bus available indication of that device is active.

3. The method in accordance with claim 2 including: varying said limiting time to adapt devices in different communication networks to perform different processing functions ancillary to byte transfers.

4. The method of claim 2 comprising:

setting different limiting time conditions at different said devices for causing the respective bus available indications at said devices to be activated at different times, whereby the times at which the bus becomes accessible to said devices are effectively staggered; and deactivating an active bus available indication at any device if that device has not initiated transmission of information within a predetermined time after activation of its respective indication.

5. The method of claim 1 wherein the logical operations performed by said user computers at said other devices include:

calculating a cumulative check residue factor for bytes successively transmitted by said any one device.

6. The method of claim 5 wherein said factor is a cyclic redundancy check residue whose final value should correspond to a last byte sent by said any one device if all of the bytes sent by said any one device have been correctly transmitted to and received by said other device.

7. The method of claim 5 wherein said check factor is a parity check residue.

8. The method of claim 1 wherein the operations performed by said user computers include:

monitoring the respective transceivers for faults.

9. In a data communication system for transferring signals constituting variable length data packets bit serially over a bus between a plurality of transceivers having multiple access passively tapped connections to said bus, each packet containing a plurality of bytes, each transceiver interfacing between the bus and a respective user device which device contains a general purpose computer, "primitive" transceiver apparatus for conducting said packet transfers with buffer storage capacity only sufficient for storing one incoming or outgoing byte at a time, said apparatus comprising:

means for transferring data byte signals from said device to said bus in a bit-serial baseband asynchronous form; each group of bit signals which form a byte signal being preceded by a pair of oppositely directed stop and start signals whose transition forms a reference time for reception of the bits in that group; the durations of said stop signals being tailored to functional characteristics of the associated user device computer;

timing means receivably coupled to said bus for timing intervals during which the signal amplitude on the bus is that associated with stop signal transmission, said timing means activating an associated bus available indication when said amplitude persists continuously for a predetermined limit time longer than the time allotted for transmission of one byte signal and an associated pair of stop-start signals; and means for applying the bus available indication to the user device for enabling that device to initiate transmission.

10. Transceiver apparatus in accordance with claim 9 comprising:

means coupled to said timing means for permitting said limit time to be varied.

11. Transceiver apparatus in accordance with claim 10 wherein said timing means comprises a programmable counter, and said means permitting varying of said limit time comprises means for applying variable digital signals to said counter for varying an overflow threshold of said counter.

* * * * *